United States Patent
Xi et al.

(10) Patent No.: US 11,338,375 B2
(45) Date of Patent: May 24, 2022

(54) PORTABLE MANUAL VERTICAL MILLING KEY DUPLICATING MACHINE

(71) Applicant: Shenzhen Xhorse Electronics Co., Ltd., Shenzhen (CN)

(72) Inventors: Yongfeng Xi, Shenzhen (CN); Yuan He, Shenzhen (CN); Yijie Hao, Weifang (CN); Chenglong Li, Shenzhen (CN); Guozhong Cao, Shenzhen (CN)

(73) Assignee: Shenzhen Xhorse Electronics Co., Ltd., Shenzhen (CN)

( * ) Notice: Subject to any disclaimer, the term of this patent is extended or adjusted under 35 U.S.C. 154(b) by 184 days.

(21) Appl. No.: 16/776,158

(22) Filed: Jan. 29, 2020

(65) Prior Publication Data
US 2020/0238400 A1    Jul. 30, 2020

(30) Foreign Application Priority Data
Jan. 29, 2019 (CN) .......................... 201920156119.6

(51) Int. Cl.
*B23C 3/35* (2006.01)
*B23C 1/20* (2006.01)
*B23Q 9/00* (2006.01)

(52) U.S. Cl.
CPC ................ *B23C 3/355* (2013.01); *B23C 1/20* (2013.01); *B23C 3/35* (2013.01); *B23Q 9/0014* (2013.01); *B23C 2220/40* (2013.01); *B23C 2235/28* (2013.01); *B23C 2235/48* (2013.01); *B23C 2260/84* (2013.01); *B23C 2270/022* (2013.01); *B23C 2270/08* (2013.01)

(58) Field of Classification Search
CPC ....... B23C 2260/84; B23C 3/35; B23C 3/355; B23C 2235/48; B23C 2235/28; B23B 2260/136
See application file for complete search history.

(56) References Cited

U.S. PATENT DOCUMENTS

| | | | |
|---|---|---|---|
| 5,833,406 A * | 11/1998 | Chies | B23C 3/35 409/81 |
| 5,951,218 A | 9/1999 | Wu | |
| 7,932,695 B2 * | 4/2011 | Uehlein-Proctor | B25F 5/02 320/113 |
| 2008/0166193 A1 * | 7/2008 | Fuchs | B23B 39/00 408/110 |

FOREIGN PATENT DOCUMENTS

| | | | |
|---|---|---|---|
| AU | 708996 A | 8/1999 | |
| GB | 2464350 A * | 4/2010 | ............ F16F 9/0209 |
| WO | WO-2018122782 A1 * | 7/2018 | ............... B23C 3/35 |

* cited by examiner

*Primary Examiner* — Alan Snyder
(74) *Attorney, Agent, or Firm* — Myers Wolin, LLC

(57) ABSTRACT

A portable manual vertical milling key duplicating machine comprising a body, a main axis component, a guide component, a clamping component, a feeding component, a power storage unit, a display unit and an electric control unit. This solution provides a pre-positioned precise guide mechanism and an adjustable handrail and is capable of improving the precision of key processing in multiple aspects and increasing stability during key processing. It has a compact structure with an upper/lower separate two-way sliding table configuration, thereby substantially reducing the machine size, and the body is divided into three areas, thereby ensuring good protection.

14 Claims, 6 Drawing Sheets

PORTABLE MANUAL VERTICAL MILLING KEY DUPLICATING MACHINE

CROSS REFERENCES TO RELATED APPLICATIONS

This application claims the benefit of the Chinese Patent Application No. CN201920156119.6, filed on Jan. 29, 2019. The disclosure and entire teachings of the Chinese Patent Application CN201920156119.6 are hereby incorporated by reference.

FIELD OF THE INVENTION

The present solution is directed toward the field of key duplicating technology, particularly a portable manual vertical milling key duplicating machine.

BACKGROUND OF THE INVENTION

When duplicating a key, the key duplicating machines used so far usually need an original key and a key blank. The blank and the original key are clamped by the respective clamping parts, and the relative position between the milling cutter and the key blank is the same as that between the probe and the original key. Manually control the movement of the guide device to copy the shape of the original key, and the milling cutter will produce the same shape as the original key on the key blank along with the movement track of the guide device, to duplicate the original key.

The guide device of the manual vertical milling key duplicating machine on the market is simple, low in processing precision, does not have a levelling adjustment function and makes it hard to ensure a high processing precision. The platform is less sensitive in movement, subject to wear and tear and uncomfortable to use. Also, the machine has an unreasonable structural layout and a large volume, which makes it inconvenient to move. The machine has no operation handrail, so when the user operates the workbench, the workbench tends to shake, thereby affecting the processing precision; or the machine only has a fixed handrail and can't satisfy the operating habits of different users.

U.S. Pat. No. 5,951,218A describes a key duplicating machine comprising: a motor having a shaft; a rotating cutting tool attached to the shaft; rack means adjacent the motor; a duplicating stylus attached to the rack means; an upper slide; a lower slide; clamping devices removably attached to the upper slide and the lower slide for clamping a key; a spring disposed between the upper slide and the lower slide for forcing the key into contact with the rotating cutting tool; a spring retainer disposed between the upper slide and the lower slide comprising a retaining rod, a torsion spring and a retaining plate; a stud secured on a side of the upper slide, the stud engaging the recess on the bottom of the retaining rod by means of the torsion spring. The retaining rod is slanting downwardly and being pivotally secured on a side of the upper slide and having a recess on the bottom thereof and the retaining plate is disposed on a side of the lower slide and having a protrusion for locking a front end of the retaining rod when the upper slide and the said retaining rod are moved.

Patent application AU708996A describes a portable key duplicating machine comprising an annular recess formed at the end of a horizontal pivot bush fixedly engaged with a pivotal base and movably engaged with a horizontal spindle supported by a pair of protrusions formed on the front left side of a substrate, for engagement of a lateral disk protrusion provided at the left end of a horizontal lead screw engaged with a guide bracket having a female thread portion formed and secured on the front right side of said substrate, in order to enable said pivotal base to move leftward or rightward by rotation of said horizontal lead screw in a clockwise direction or a counter clockwise direction by user's one hand, so that the contour of the teeth of a key sample clamped by a left clamping device provided on said pivotal base can be traced by a duplicating stylus arranged on the front left side of said substrate, and a key blank clamped by a right clamping device provided on said pivotal base can be cut into the contour of the teeth to be the same as that of said key sample, by a rotating cutting tool arranged on the front right side of said substrate and aligned with said duplicating stylus, when said pivotal base is angularly moved to a proper position by user's other hand.

SUMMARY

To overcome the disadvantages of the current technology, this invention provides a portable manual vertical milling key duplicating machine that is characterized by a pre-positioned precise guide mechanism and an adjustable hand-rail and is capable of improving the precision of key processing in multiple aspects and increasing stability during key processing.

To resolve the aforesaid technical issue, this invention provides the following technical design: a portable manual vertical milling key duplicating machine, which comprises a body, a main axis component, a guide component, a clamping component, a feeding component, a power storage unit, a display unit and an electric control unit. The said body has a fixed handrail, the lower part on the same side of the said handrail has a first lever, and the said first lever is connected to the body via a universal bearing. The said body also has a second lever. The said body is equipped with a gear switch, and the said body is also fitted with a handle. The said main axis component and the guide component are jointly fixed to the base of the body. The said clamping component consists of a first clamping component and a second clamping component: the said first clamping component is installed on the same side as the main axis component, and the said second clamping component is installed on the same side as the guide component. The said feeding component is an intermediate movement component that provides the movement between the main axis component and the clamping component, and the said feeding component comprises a first feeding module, a second feeding module and a third feeding module. The said power storage unit is fixed to the rear side of the body and can supply power in the absence of an external power source. The said display unit is fixed to the third feeding module and has a power display function to show the remaining power of the power storage unit or charging status. It also has a levelling adjustment function which helps the user judge whether the probe at the end of the guide component and the cutter at the end of the main axis component remain at the same height. The said electric control unit is used to connect the power storage unit and the display unit.

In a preferred embodiment of this invention, the said base has a Z-shaped sliding chute which can move in a zigzag direction in relation to the body. The said guide component comprises a rotary knob, a tuning element, a first flexible element, a second flexible element, a push rod and a probe; the said rotary knob is connected to one end of the guide component via thread, one end of the said tuning element is connected to the rotary knob, the other end is flexibly connected to the push rod through the first flexible element, the said push rod is bushed with the second flexible element that is used for resetting, one end of the said push rod is fitted with a probe, and the said guide component has two gears. The upper gear is used for levelling, and in the lower gear, the probe will have an upward movement space that is lower than the height of the milling cutter to carry out pre-positioning before cutting.

In a preferred embodiment of this invention, the distance between said first clamping component and the second clamping component is equal to that between the main axis component and the guide component; the first clamping component is used to clamp the key blank, the second clamping component is used to clamp the original key, and the first clamping component and the second clamping component have the same structure.

In a preferred embodiment of this invention, the said first feeding module is connected to the body by a series of slide bars and thin flake linear bearings and is arranged in the lower area of the body; the said slide bars are fixed to the body, the said flake spring is embedded in the first feeding module, and the said first feeding module can move in the Y axis direction of the body. By the same token, a flake spring is embedded in the second feeding module and slide bars are fixed to the said first feeding module; the second feeding module can move in the X axis direction in relation to the first feeding module and move in the X axis direction and Y axis direction in relation to the body, and the said clamping component is fixed to the first feeding module. The said second feeding module is connected to the first lever through the universal bearing; the first lever can be driven to control the movement of the second feeding module within a certain range in the XY-plane in relation to the body. The said third feeding module can move along the Z axis in relation to the body, the said main axis component and the guide component are both fixed to the third feeding module and the said third feeding module is fitted with a rack. The spindle end of the second lever is equipped with a gear. When turned in the normal direction, the second lever can control the third feeding module to move along the Z axis using the rack mechanism of the gear; when turned in the axial direction, the second lever can be locked, thereby fixing the third feeding module at a certain height on the Z axis.

In a preferred embodiment of this invention, the said handrail is rotated and locked on one side of the body to serve as an operational support and help the user stabilize the workbench.

In a preferred embodiment of this invention, the said second lever is connected to the body through the spindle and can rotate in relation to the body, and the said second lever has a locking mechanism.

In a preferred embodiment of this invention, the said handle is fixed to the upper right part of the body to make the machine portable.

In a preferred embodiment of this invention, the said first feeding module and the second feeding module have a locking mechanism to lock the movement of the second feeding module in two directions in relation to the body on an as-needed basis.

In a preferred embodiment of this invention, a flexible element is arranged between the third feeding module and the body; the said flexible element has the restoring force that will force the third feeding module to move upward along the Z axis, and the said flexible element uses a nitrogen spring.

In a preferred embodiment of this invention, the said second lever has a lever mechanism with a locking function, comprises a lever, a lever servo axis, a lever sleeve, a sliding bush A, a sliding bush B, a locking copper column, a key duplicating machine body, a lever base, a lever axis, an arc limiting groove and an arc limiting boss; the said lever sleeve is installed on the key duplicating machine body and rigidly connected to the key duplicating machine body, the said lever sleeve is fitted with the said arc limiting boss, the said sliding bush A and the said sliding bush B are installed in the internal hole of the said lever sleeve, the said lever servo axis is equipped with the said lever base, the said lever axis and the said arc limiting groove, where the said lever axis is flexibly connected to the internal holes of the said sliding bush A and the said sliding bush B, the said arc limiting groove is installed around the arc limiting groove, the bottom of the said lever is fitted with the said locking copper column.

In a preferred embodiment of this invention, the said lever base of the said lever servo axis is provided with stepped holes, the said stepped holes are divided into the upper, middle and lower sections, the hole diameters decrease from top to bottom; the middle section has threaded holes, while the upper and lower sections have unthreaded holes.

In a preferred embodiment of this invention, the said locking copper column is arranged in the lower section of the stepped hole of the said lever base, constitutes a loose coupling relation with the unthreaded hole in the lower section, the top and bottom surfaces of the said locking copper column are round, the lower round surface of the said locking copper column touches the internal round surface of the said arc limiting boss, the said locking copper column may be replaced with abrasion-resistant plastic material.

In a preferred embodiment of this invention, the upper end of the said lever is a handle, the lower end is a threaded lever rod, the said lever rod is connected to the upper threaded hole on the said lever base.

In a preferred embodiment of this invention, the guide component comprises a mechanism body, a rotary knob, a tuning element, a first axis sleeve, a sealing element, a first flexible element, a first supporting element, a second axis sleeve, a handle, a second supporting element, a second flexible element, a push rod, a third axis sleeve and a probe; one end of the said tuning element is fixed to the rotary knob, the other end is connected to the said first axis sleeve via external thread, the end surface is fitted with the said push rod; the said sealing element is arranged in the annular groove of the said first supporting element and pressed with the said rotary knob, the said first supporting element is internally embedded in the said second axis sleeve; the said first supporting element is arranged inside the said first axis sleeve and the said second axis sleeve; one end of the said first flexible element pushes upward against the said first axis sleeve and the other end is arranged downward; the said supporting element is internally embedded in the said first axis sleeve and pressed against the said first supporting element; the upper end of the said second flexible element pushes against the said second supporting element, the lower end is pressed against the said third axis sleeve, the lower end of the said push rod is provided with a cylindrical hole and rigidly connected to the said probe.

In a preferred embodiment of this invention, one end of the said tuning element is fitted with the said rotary knob via a buckle, the other end of the said tuning element is connected to the said first axis sleeve via thread, the end surface of the said tuning element is fitted with the push rod;

the external side of the said first axis sleeve is provided with a cam path, and the said first axis sleeve is fixed to the base without a movable axis.

Compared to the current technology, this invention will create the following benefits: this invention provides a pre-positioned precise guide mechanism and an adjustable handrail, and is capable of improving the precision of key processing in multiple aspects and increasing stability during key processing. It has a compact structure with an upper/lower separate two-way sliding table configuration, thereby substantially reducing the machine size. The sliding table uses a thin flake linear bearing and a hard steel rail, which ensures good abrasion resistance, a high level of operational sensitivity and very good operating performance. It adds a portable curved handle which facilitates portable use. It has a power storage unit, which is rechargeable and has a built-in charging interface that can be directly connected to the built-in power source; it has a power display unit and a levelling unit, which help the user to complete a high-precision duplicate of the key in a more careful manner, and the body is divided into three areas, thereby ensuring good protection.

Other features and advantages of the present invention will be apparent from the following more detailed description, taken in conjunction with the accompanying drawings which illustrate, by way of example, the principles of the solution.

Figure 1:
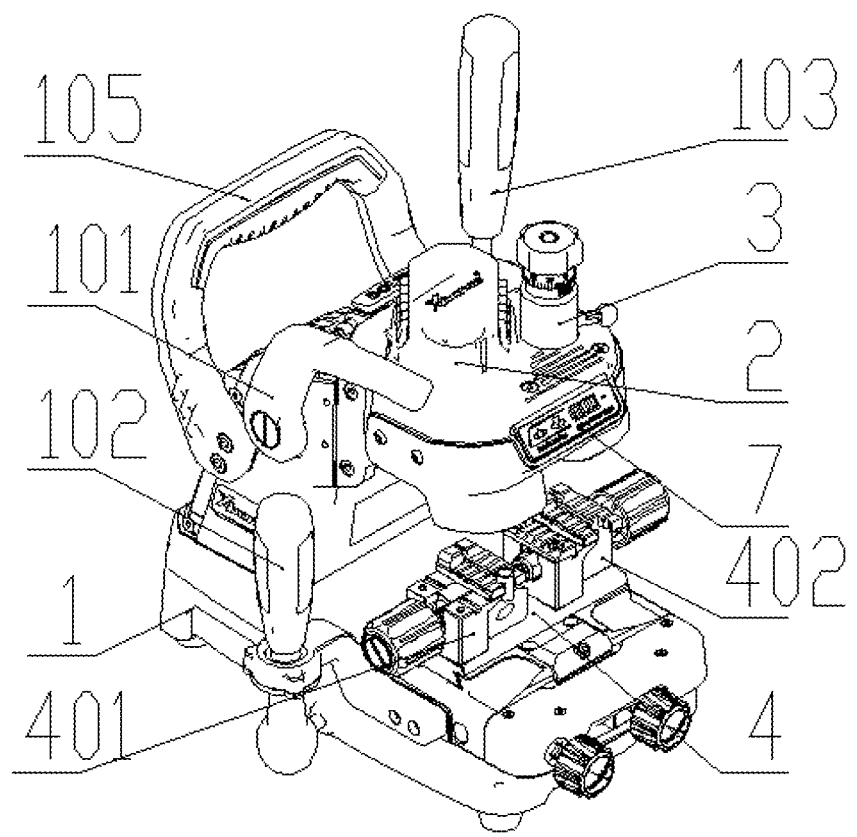
FIG. 1 shows the schematic diagram for the vertical structure on the left side of the key duplicating machine under this invention.
Figure 2:
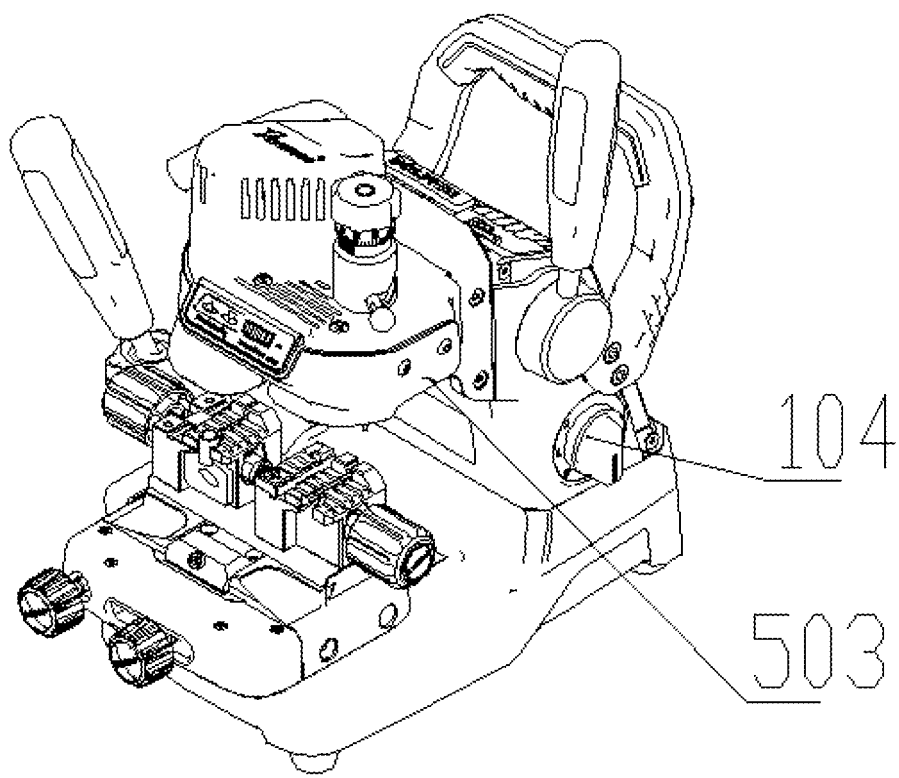
FIG. 2 shows the schematic diagram for the vertical structure on the right side of the key duplicating machine under this invention.
Figure 3:
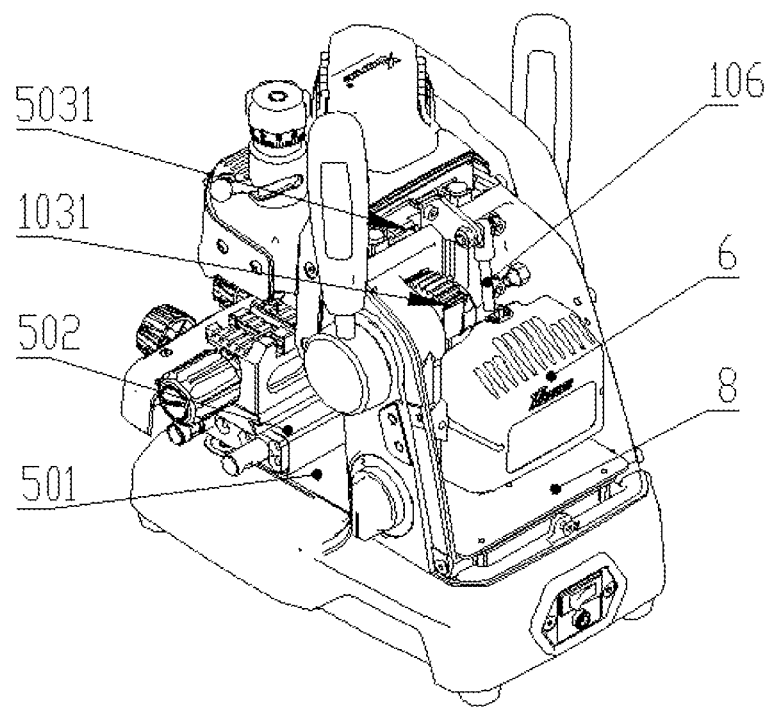
FIG. 3 shows the schematic diagram for the vertical structure on the back side of the key duplicating machine under this invention.
Figure 4:
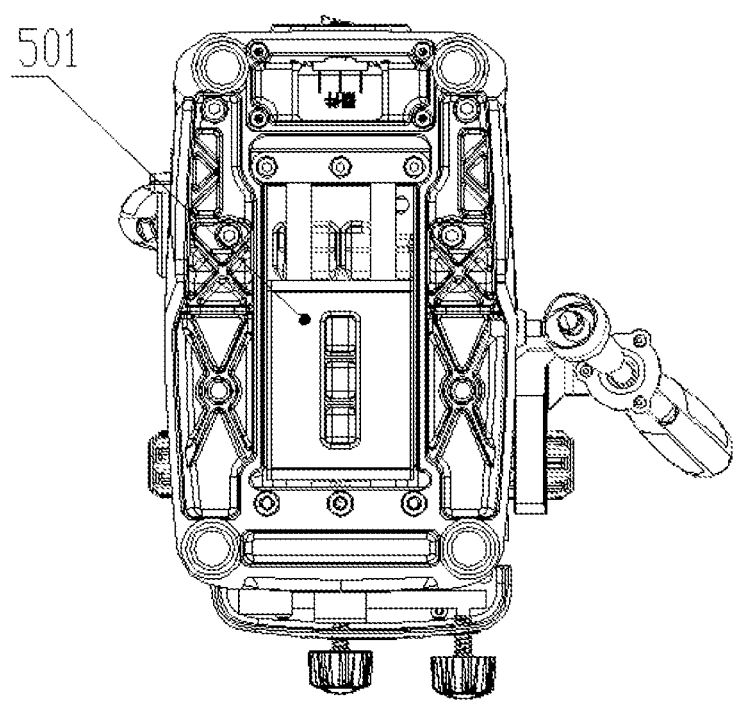
FIG. 4 shows the schematic diagram for the structure at the bottom of the key duplicating machine under this invention.

The purpose realization, functional characteristics and advantages of this solution will be further described with the preferred embodiment and the attached drawings.

DETAILED DESCRIPTION OF THE PREFERRED EMBODIMENTS

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

The key duplication machine will be described in the preferred embodiments of this invention with the attached drawings. It should be understood that the preferred embodiments described here are only intended to interpret this invention and all other possible embodiments of the key duplication machine invented are within the scope of protection of the present invention.

As illustrated in FIGS. 1-4, this invention is a portable manual vertical milling key duplicating machine, which comprises a body 1, a main axis component 2, a guide component 3, a clamping component 4, a feeding component 5, a power storage unit 6, a display unit 7 and an electric control unit 8. The body 1 is divided into a processing area, a lower movement area and a back structural area. The body 1 has a fixed handrail 101, below the handrail 101 has a first lever 102, and the first lever 102 is connected to the body 1 via a universal bearing. The body 1 also has a second lever 103. The body is equipped with a gear switch 104, and the body 1 is also fitted with a handle 105. The main axis component 2 and the guide component 3 are jointly fixed to the base of the body; the base has a Z-shaped sliding chute which can move in a zigzag direction in relation to the body 1. The guide component 3 comprises a rotary knob 3101, a tuning element 3102, a first flexible element 3105, a second flexible element 3110, a push rod 3111 and a probe 3113, where the rotary knob 3101 is connected to one end of the guide component 3 via thread, one end of the said tuning element 3102 is connected to the rotary knob 3101, the other end is flexibly connected to the push rod 3111 through the first flexible element 3105, the push rod 3111 is bushed with the second flexible element 3110 that is used for resetting, one end of the said push rod 3111 is fitted with a probe 3113, and the guide component 3 has two gears. The upper gear is used for levelling, and at the lower gear, the probe will have an upward movement space that is lower than the height of the milling cutter to carry out pre-positioning before cutting. The guide component 3 can adjust the guide pin at the lower end of the guide component 3 to remain in the same plane as the milling cutter at the lower end of the main axis component 2, thereby ensuring a high processing precision in key processing, and the guide component 3 has two gears. The upper gear is used for levelling, and at the lower gear, the probe will have an upward movement space that is lower than the height of the milling cutter to carry out pre-positioning before cutting. The clamping component 4 consists of a first clamping component 401 and a second clamping component 402: the first clamping component 401 is installed on the same side as the main axis component 2, and the second clamping component 402 is installed on the same side as the guide component 3. The distance between the first clamping component 401 and the second clamping component 402 is equal to that between the main axis component 2 and the guide component 3; the first clamping component 401 is used to clamp the key blank, the second clamping component 402 is used to clamp the original key, and the first clamping component 401 and the second clamping component 402 have the same structure. The feeding component 5 is an intermediate movement component that provides the movement between the main axis component 2 and the clamping component 4, and the said feeding component 5 comprises a first feeding module 501, a second feeding module 502 and a third feeding module 503. The said first feeding module 501 is connected to the body 1 by a series of slide bars and thin flake linear bearings and is arranged in the lower area of the body 1; the slide bars are fixed to the body 1, the said flake spring is embedded in the first feeding module 501, and the said first feeding module 501 can move in the Y axis direction of the body 1. By the same token, a flake spring is embedded in the second feeding module 502; slide bars are fixed to the first feeding module 501, the second feeding module 502 can move in the X axis direction in relation to the first feeding module 501 and move in the X axis direction and Y axis direction in relation to the body 1, and the clamping component 4 is fixed to the first feeding module 501. The second feeding module 502 is connected to the first lever 102 through the universal bearing; the first lever 102 can be driven to control the movement of the second feeding module 502 within a certain range in the XY-plane in relation to the body 1. The third feeding module 503 can move along the Z axis in relation to the body 1, the main axis component 2 and the guide component 3 are both fixed to the third feeding module 503 and the third feeding module 503 is fitted with a rack 5031. The spindle end of the second lever 103 is equipped with a gear 1031. When turned in the normal direction, the second lever can control the third feeding module 503 to move along the Z axis using the rack mechanism of the gear; when turned in the axial direction, the second lever 103 can be locked, thereby fixing the third feeding module 503 at a certain height on the Z axis. The power storage unit 6 is fixed to the rear side of the body 1 and can supply power in the absence of an external power source; the display unit 7 is fixed to the third feeding module 503 and has the power display function to show the remaining power of the power storage unit 6 or charging status. It also has the levelling adjustment function which helps the user judge whether the probe at the end of the guide component 3 and the cutter at the end of the main axis component 2 remain at the same height. The electric control unit 8 is used to connect the power storage unit and the display unit.

The handrail 101 is rotated and locked on one side of the body 1 to serve as an operational support and help the user stabilize the workbench. The second lever 103 is connected to the body 1 through the spindle and can rotate in relation to the body 1, and the second lever 103 has a locking mechanism. The handle 105 is fixed to the upper right part of the body 1 to make the machine portable. The first feeding module 501 and the second feeding module 502 have a locking mechanism to lock the movement of the second feeding module 502 in two directions in relation to the body 1 on an as-needed basis. A flexible element 106 is arranged between the third feeding module 503 and the body 1: the flexible element 106 has the restoring force that will force the third feeding module 503 to move upward along the Z axis, and the flexible element 106 uses a nitrogen spring.

In detail, to duplicate a key, connect the power supply, set the guide component 3 to the first gear, and lock the milling cutter and the probe 3113 so that the milling cutter will be obviously lower than the probe. At this time, engage the second lever 103 to move the third feeding module 503 downward until the milling cutter touches the first clamping component 401, rotate the second lever 103, and lock the third feeding module 503. At this time, loosen the locking jack screw of the probe so that the probe will freely fall to make contact with the second clamping component 402 until the display unit 7 shows that levelling has finished, lock the probe, and unlock the third feeding module 503. Set the guide component 3 to the second gear, clamp a key blank and an original key in the first clamping component 401 and the second clamping component 402 respectively, drive the third feeding module 503 to descend to a certain height, control the milling cutter on the Z axis to move downward and fully discern the key shape. After the characteristics to process are fully discerned, lock the third feeding module 503, drive the first lever 102 so that the probe will move along the shape of the original key, and the milling cutter can follow the shape on the key blank to duplicate the shape. When the characteristics to cut meet the depth requirement in the Z direction, drive the second lever 103 until the probe makes contact with the lowest point of the bit of the original key in the Z direction and there is no space for upward movement. At this time, lock the third feeding module 503, drive the first lever 102 so that the probe will move along the shape of the original key, and the milling cutter can follow the shape on the key blank to duplicate the shape.

The present invention provides a pre-positioned precise guide mechanism and an adjustable handrail, and is capable of improving the precision of key processing in multiple aspects and increasing stability during key processing. It has a compact structure with an upper/lower separate two-way sliding table configuration, thereby substantially reducing the machine size. The sliding table uses a thin flake linear bearing and a hard steel rail, which ensures good abrasion resistance, a high level of operational sensitivity and very good operating performance. It adds a portable curved handle which facilitates portable use. It has a power storage unit, which is rechargeable and has a built-in charging interface that can be directly connected to the built-in power source; it has a power display unit and a levelling unit, which help the user to complete a high-precision duplicate of the key in a more careful manner; and the body is divided into three areas, thereby ensuring good protection.

Figure 5:
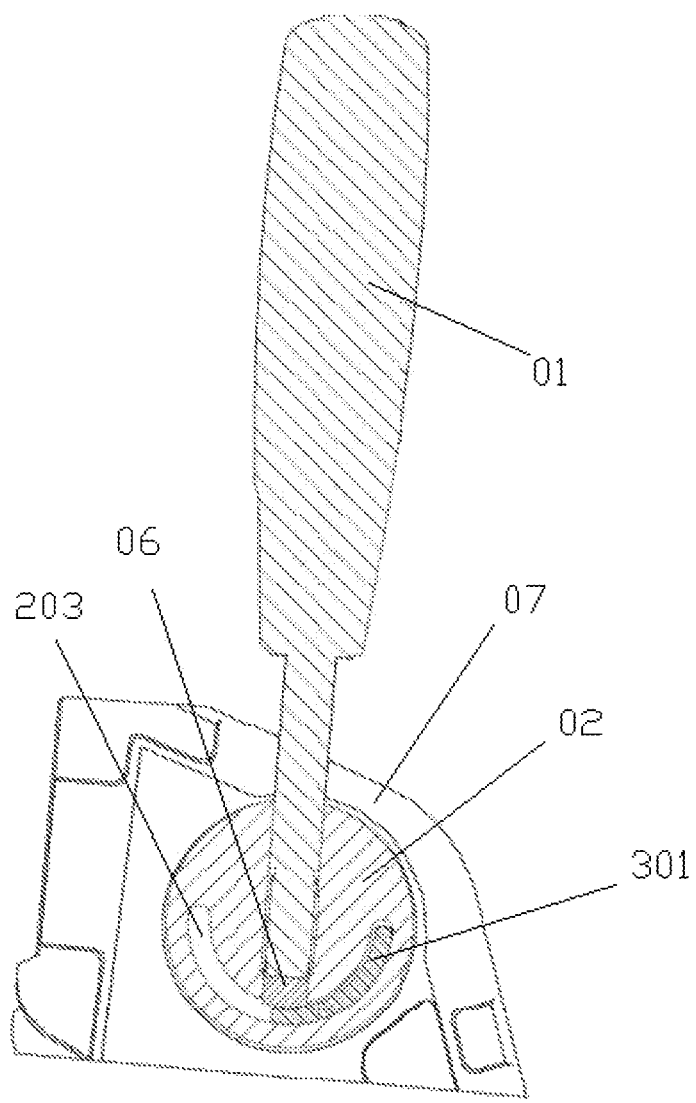
FIG. 5 shows the structural schematic diagram for the section view of the second lever of the key duplicating machine under this invention.
Figure 6:
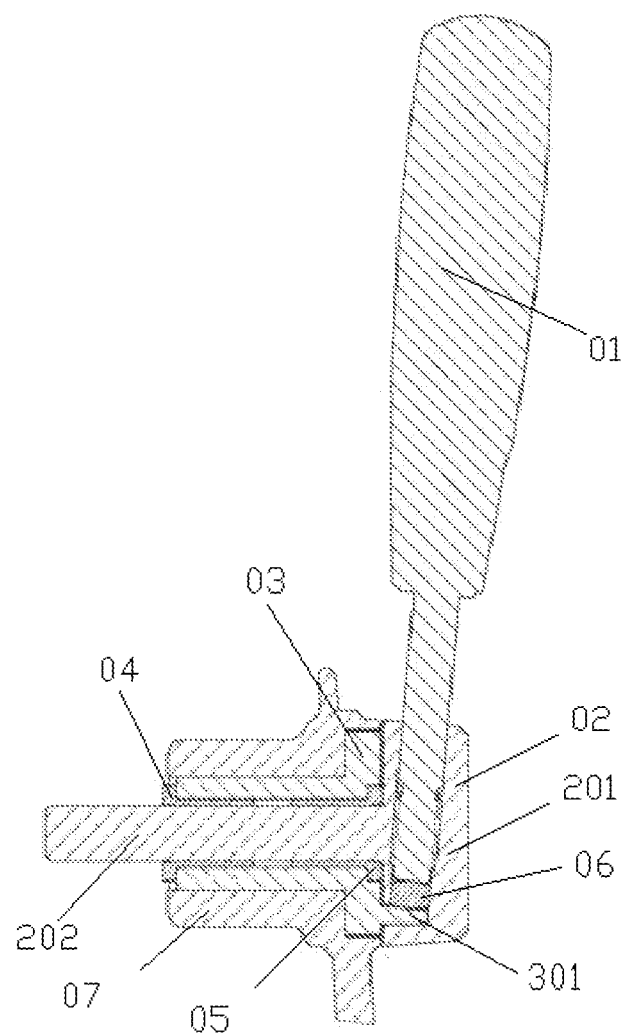
FIG. 6 shows the structural schematic diagram for a local part of the second lever of the key duplicating machine under this invention from a section view.

Of the preferred embodiments, the first lever 102 is a lever with the normal structure, such as a universal bearing into which the first lever is inserted; the second lever 103 has a lever mechanism with a locking function. As illustrated in FIG. 5 and FIG. 6, the lever mechanism comprises a lever 01, a lever servo axis 02, a lever sleeve 03, a sliding bush A 04, a sliding bush B 05, a locking copper column 06, a key duplicating machine body 07, a lever base 201, a lever axis 202, an arc limiting groove 203 and an arc limiting boss 301. The lever sleeve 03 is installed on the key duplicating machine body 07 and rigidly connected to the key duplicating machine body 07 with bolts. The lever sleeve 03 is fitted with an arc limiting boss 301, the sliding bush A 04 and the sliding bush B 05 are installed in the internal hole of the lever sleeve 03, the lever servo axis 02 is equipped with a lever base 201, a lever axis 202 and an arc limiting groove 203, where the lever axis 202 is flexibly connected to the internal holes of the sliding bush A 04 and the sliding bush B 05, the arc limiting groove 203 is installed around the arc limiting groove 301, and the bottom of the lever 01 is fitted with a locking copper column 06.

The lever base 201 of the lever servo axis 02 is provided with stepped holes, which are divided into the upper, middle and lower sections, and the hole diameters decrease from top to bottom; the middle section has threaded holes, while the upper and lower sections have unthreaded holes.

The locking copper column 06 is arranged in the lower section of the stepped hole of the lever base 201 and constitutes a loose coupling relation with the unthreaded hole in the lower section. The top and bottom surfaces of the locking copper column 06 are round, the lower round surface of the locking copper column 06 touches the internal round surface of the arc limiting boss 301, and the locking copper column 06 may be replaced with abrasion-resistant plastic material.

The upper end of the lever 01 is a handle, the lower end is a threaded lever rod, and the lever rod is connected to the upper threaded hole on the lever base 201.

The second lever 103 has a lever mechanism with a locking function. The lever mechanism comprises a lever 01, a lever servo axis 02, a lever sleeve 03, a sliding bush A 04, a sliding bush B 05, a locking copper column 06, a key duplicating machine body 07, a lever base 201, a lever axis 202, an arc limiting groove 203 and an arc limiting boss 301. The guide base mechanism is composed of a lever 01, a lever servo axis 02, a lever sleeve 03, a sliding bush A 04, a sliding bush B 05 and a locking copper column 06. The key duplicating machine body 07 provides a position to install the lever mechanism. The lever sleeve 03 is installed on the key duplicating machine body 07 and fixed to the key duplicating machine body 07 with bolts and other methods. The lever sleeve 03 is fitted with an arc limiting boss 301, the sliding bush A 04 and the sliding bush B 05 are installed in the internal hole of the lever sleeve 03, and a mechanical limiting method is used to ensure they will not break out of the internal hole of the lever sleeve 03. The lever servo axis 02 is fitted with a lever base 201, a lever axis 202 and an arc limiting groove 203, where the lever axis 202 passes through the internal hole of the sliding bush A 04 and the sliding bush B 05 and is connected to the motion mechanism of the key processing machine. The arc limiting groove 203 is installed around the arc limiting boss 301. A mechanical limiting method is used to tension the lever axis 202 so that the lever servo axis 02 will fit the end surface of the sliding bush B 05 and ensure the sliding bush B 05 will not break out of the lever sleeve 03; a mechanical limiting method is used to press the sliding bush A 04 and ensure the sliding bush A 04 will not break out of the lever sleeve 03. After being installed in the aforesaid manner, the lever servo axis 02 can rotate by a certain angle to the extent of the lever sleeve 03 and not break out in the axial direction. The lever base 201 of the lever servo axis 02 is provided with stepped holes, which are divided into the upper, middle and lower sections, and the hole diameters decrease from top to bottom; the middle section has threaded holes, while the upper and lower sections have unthreaded holes. The locking copper column 06 is arranged in the lower section of the stepped hole of the lever base 201, constitutes a loose coupling relation with the unthreaded hole in the lower section, and can freely slide along the axial line of the hole. The top and bottom surfaces of the locking copper column 06 are round, the lower round surface of the locking copper column 06 touches the internal round surface of the arc limiting boss 301 through deadweight, and the material of the locking copper column 06 may be replaced with abrasion-resistant plastic material. The upper end of the lever 01 is a handle, the lower end is a threaded lever rod; the fitting relation between the thread and the lever base 201 is used to screw the lever 01 into the lever base 201 until it directly touches the upper round surface of the locking copper column 06.

For certain tasks, the handle of the lever 01 can be turned so that the lever 01 can be screwed into the lever base 201 without touching the locking copper column 06. Pull the handle of the lever 01 around the axial line of the lever axis 202 to drive the axis to rotate so that the head of the key processing machine can feed up and down.

Turn the handle of the lever 01 so as to screw the lever 01 into the lever base 201 and press the locking copper column 06. When the pressing force reaches a certain level, the friction force between the locking copper column 06 and the internal round surface of the arc limiting boss 301 will lock the lever servo axis 02 and the lever sleeve 03, and at this time, the lever 01 cannot move even if it is pressed.

With the lever mechanism that has the locking function, the lever can be moved up and down so that the key duplicating machine head will move up and down, and the lever can be turned so that the key duplicating machine head will be locked in any position mid-stroke, thereby creating a simple and compact structure; the external look is highly integral.

Figure 7:
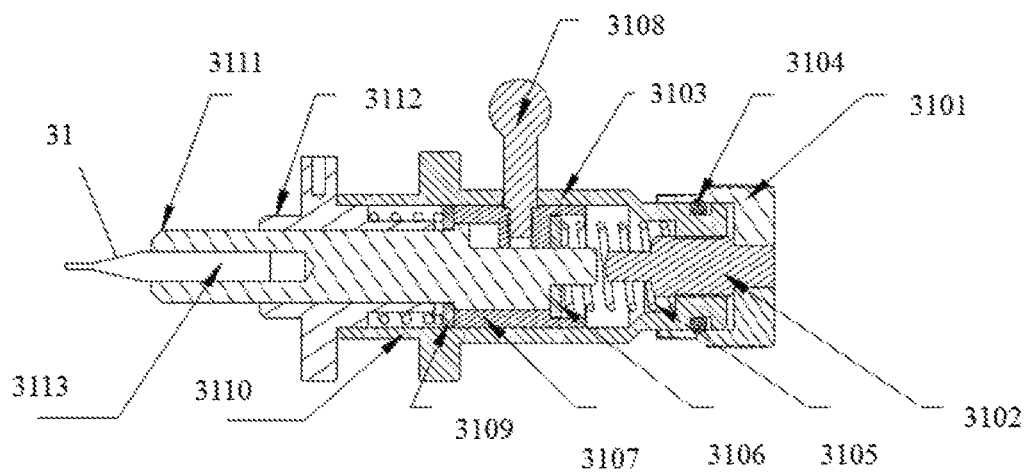
FIG. 7 shows the structural schematic diagram for the section view of the guide component of the key duplicating machine under this invention.
Figure 8:
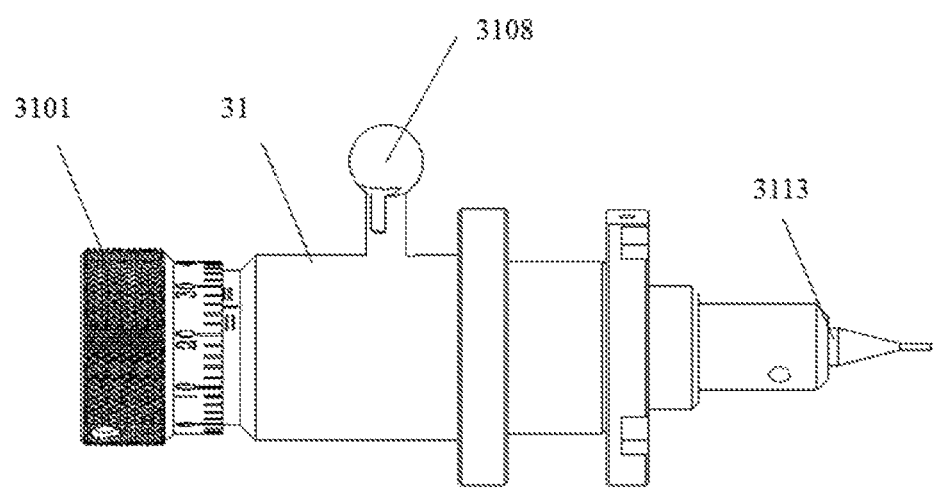
FIG. 8 shows the schematic diagram for the vertical structure of the guide component of the key duplicating machine under this invention from a section view.

Of the preferred embodiments, as illustrated in FIG. 7 and FIG. 8, the guide component 3 comprises a mechanism body 31, a rotary knob 3101, a tuning element 3102, a first axis sleeve 3103, a sealing element 3104, a first flexible element 3105, a first supporting element 3106, a second axis sleeve 3107, a handle 3108, a second supporting element 3109, a second flexible element 3110, a push rod 3111, a third axis sleeve 3112 and a probe 3113. One end of the tuning element 3102 is fixed to the rotary knob 3101, the other end is connected to the first axis sleeve 3103 via external thread, and the end surface is fitted with a push rod 3111; the sealing element 3104 is arranged in the annular groove of the first supporting element 3103 and pressed with the rotary knob 3101, and the first supporting element 3106 is internally embedded in the second axis sleeve 3107; the first supporting element 3105 is arranged inside the first axis sleeve 3103 and the second axis sleeve 3107. One end of the first flexible element 3105 pushes upward against the first axis sleeve 3103 and the other end is arranged downward. The supporting element 3109 is internally embedded in the first axis sleeve 3103 and pressed against the first supporting element

3106. The upper end of the second flexible element 3110 pushes against the second supporting element 3109, the lower end is pressed against the third axis sleeve 3112, the lower end of the push rod 3111 is provided with a cylindrical hole and rigidly connected to the probe 3113. The upper end of the second flexible element 3110 pushes against the second supporting element 3109, the lower end is pressed against the third axis sleeve 3112, the lower end of the push rod 3111 is provided with a cylindrical hole and rigidly connected to the probe 3113.

One end of the tuning element 3102 is fitted with the rotary knob 3101 via a buckle, the other end of the tuning element 3102 is connected to the first axis sleeve 3103 via thread, and the end surface of the tuning element 3102 is fitted with the push rod 3111.

The external side of the first axis sleeve 3103 is provided with a cam path, and the first axis sleeve 3103 is fixed to the base without a movable axis.

The first flexible element 3105 and the second flexible element 3110 both remain at the compressed status.

Working principle: in the guide component 3, the rotary knob 3101 and the tuning element 3102 are connected through bush, and the rotary knob 3101 has scale marks on the external side to indicate the tuning difference. One end of the tuning element 3102 is fixed to the rotary knob 3101, the other end is connected to the first axis sleeve 3103 via external thread, and the end surface is fitted with a push rod 3111. The external side of the first axis sleeve 3103 is provided with a cam path, and the first axis sleeve 3103 is fixed to the base without a movable axis. The sealing element 3104 is arranged in the annular groove of the first axis sleeve 3103 and pressed with the rotary knob 3101 to eliminate the clearance between the rotary knob 3101 and the first axis sleeve 3103, in order to prevent dust and other things from polluting the internal environment of the structure, and the sealing element 3104 has a good damping performance to make it more comfortable for the user when the knob is turned. The first supporting element 3106 is internally embedded in the second axis sleeve 3107; the first flexible element 3105 remains at the compressed status and is arranged in the first axis sleeve 3103 and the second axis sleeve 3107. One end of the first flexible element pushes against the first axis sleeve 3103 and the other end is pressed downward against the first supporting element 3106; the upper end of the second axis sleeve 3107 overcomes the restoring force passed downward by the first flexible element 3105 in the axial direction through the first supporting element 3106, and the lower end overcomes the restoring force passed upward by the second flexible element 3110 in the axial direction through the second supporting element 3109. The handle 3108 crosses the cam path on the first axis sleeve 3103 in the axial direction and is embedded in the second axis sleeve 3107. The handle 3108 can move along the cam path and be stopped between the upper and lower extreme locations; the axis sleeve 3107 can move in the axial and radial directions with the handle 3108 and stop in the two extreme positions. The second supporting element 3109 is internally embedded in the first axis sleeve 3103, and the upper end pushes against the lower end of the push rod 3111 and presses on the second supporting element 3110; the second flexible element 3110 remains at the compressed status with the upper end pushing against the second supporting element 3109 and the lower end pressing on the third axis sleeve 3112, and the axial force will compel the second flexible element 3110 to keep away from the third axis sleeve 3112. The lower end of the push rod is provided with a cylindrical hole to fit the probe 3113, and the restoring force of the second flexible element 3110 passes to the push rod 3111 through the second supporting element so that it will tend to move in the axial direction.

In the portable manual vertical milling key duplicating machine under this invention, the structure of the guide component 3 can be divided into two groups of functional components that are correlated with the first supporting element 3106, the second supporting element 3109 and the push rod 3111.

The first group of functional components is the probe height tuning mechanism, which comprises the rotary knob 3101, the tuning element 3102, the first axis sleeve 3103, the push rod 3111 and the probe 3113. Rotate the rotary knob 3101 to drive the tuning element 3102 to move back and forth in the axial direction in relation to the first axis sleeve 3104, thereby limiting the extreme positions of the push rod 3111 and the probe 3113.

The second group of functional components is the pre-positioning mechanism, which comprises the first axis sleeve 3103, the second axis sleeve 3107, the third axis sleeve 3112, the first supporting element 3106, the second supporting element 3109, the first flexible element 3105, the second flexible element 3110, the handle 3108 and the push rod 3111. In detail, the first axis sleeve 3103, the first flexible element 3105, the first supporting element 3106, the second axis sleeve 3107 and the push rod compose the first retractable area, and the first flexible element 3105 has the restoring force that will expand the area in the axial direction. The second axis sleeve 3107, the second supporting element 3109, the second flexible element 3110 and the third axis sleeve 3112 jointly constitute the second retractable area, and the second flexible element 3110 has the restoring force that will expand the area in the axial direction.

The pre-positioning mechanism is further divided into two gears:

In the first gear, the handle 3108 will be moved and fixed in the upper extreme position. At this stage, the first retractable area will become the smallest, the first flexible element 3105 will have the maximum compression amount, the second axis sleeve 3107 will remain in the extreme position in the axial direction, and the push rod 3111 will push the tuning element under the action of the second flexible element 3110 and the second supporting element 3109. At this time, rotate the rotary knob to adjust the extreme height of the probe 3113 in the axial direction, that is, to set the axial relative position of the probe 3113 and the milling cutter. In this gear, the relative position between the milling cutter and the key blank will be totally equivalent to that between the probe and the original key. In the second gear, the handle 3108 will be moved and fixed in the lower extreme position. In this gear, the first supporting element 3106 will simultaneously push the push rod 3111 and the second axis sleeve 3107 under the action of the first flexible element 3105, and the push rod 3111 will break away from the tuning element under the action of the first flexible element 3105. At this time, the axial interval between the probe 3113 and the original key will be greater than (smaller than) the axial interval between the milling cutter and the key blank. Before duplicating the key, the user can locate the characteristics to cut and further press the main axis part downward; the push rod 3111 will overcome the restoring force of the first flexible element 3105 to return to the preset axial height and ensure the probe 3113 and the milling cutter will have an ideal relative position when the milling cutter does the cutting work. This pre-positioning mode can avoid cutting errors as a result of artificial vibration in operation and ensure a high processing precision when the milling cutter is in operation.

By using the guide component 3 as a tuning guide mechanism, the portable manual vertical milling key duplicating machine under this invention achieves a high tuning precision, good sealing performance and a high level of comfort in operation. Also, it can locate the key shape in advance, increase cutting stability and further improve overall processing precision.

This invention is not limited to the aforesaid implementation methods. The aforesaid preferred embodiments can also give rise to a multitude of revisions, replacements or combinations in other forms by following the contents of the aforesaid preferred embodiments, using normal technical knowledge and means in the area and not breaking away from the basic technical thought of this invention above, and other preferred embodiments obtained in this way shall also fall under the scope of protection of the present invention.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claim is:

1. A portable manual vertical milling key duplicating machine comprising:
    a body,
    a main axis component,
    a guide component,
    a clamping component,
    a feeding component,
    a power storage unit,
    a display unit and an electric control unit, wherein
    the body has a fixed handrail, a first lever, a second lever and a gear switch, wherein the second lever connects with the body, wherein
    the said main axis component and the guide component are jointly fixed to the base of the said body, wherein
    the clamping component consists of a first clamping component and a second clamping component, wherein the first clamping component is installed on the same side as the said main axis component and the second clamping component is installed on the same side as the said guide component, wherein the feeding component is an intermediate movement component that provides the movement between the main axis component and the clamping component and the feeding component comprises a first feeding module, a second feeding module and a third feeding module, wherein
    the power storage unit is fixed to the rear side of the body and can supply power in the absence of an external power source, wherein
    the display unit is fixed to the third feeding module and has a power display function to show the remaining power of the power storage unit or charging status and the display unit also has a levelling adjustment function which helps the user judge whether the probe at the end of the guide component and the cutter at the end of the main axis component remain at the same height, wherein
    the electric control unit is used to connect the power storage unit and the display unit, wherein the second lever has a lever mechanism with a locking function and comprises a lever, a lever servo axis, a lever sleeve, a sliding bush A, a sliding bush B, a locking copper column, a key duplicating machine body, a lever base, a lever axis, an arc limiting groove and an arc limiting boss, wherein
    the lever sleeve is installed on the key duplicating machine body and rigidly connected to the key duplicating machine body and the lever sleeve is fitted with the said arc limiting boss, wherein
    the sliding bush A and the said sliding bush B are installed in the internal hole of the said lever sleeve, and wherein
    the lever servo axis is equipped with the lever base, the lever axis and the arc limiting groove, where the lever axis is flexibly connected to the internal holes of the sliding bush A and the sliding bush B, the arc limiting groove is installed around the arc limiting groove and the bottom of the lever is fitted with the locking copper column.

2. The portable manual vertical milling key duplicating machine according to claim 1, wherein
    the guide component comprises a rotary knob, a tuning element, a first flexible element, a second flexible element, a push rod and a probe, wherein the rotary knob is connected to one end of the guide component via thread and one end of the tuning element is connected to the rotary knob and the other end is flexibly connected to the push rod through the first flexible element, wherein
    the push rod is bushed with the second flexible element that is used for resetting and one end of the push rod is fitted with a probe, wherein
    the guide component has two gears, the upper gear is used for levelling, and in the lower gear, the probe will have an upward movement space that is lower than the height of the milling cutter to carry out pre-positioning before cutting.

3. The portable manual vertical milling key duplicating machine according to claim 1, wherein the distance between the first clamping component and the second clamping component is equal to that between the main axis component and the guide component, wherein the first clamping component is used to clamp a key blank and the second clamping component is used to clamp an original key and the first clamping component, and the second clamping component have the same structure.

4. The portable manual vertical milling key duplicating machine according to claim 1, wherein the first feeding module is connected to the body by a series of slide bars and linear bearings, and is arranged in a lower area of the body, wherein the slide bars are fixed to the body and the said spring is embedded in the first feeding module, the first feeding module can move in the Y axis direction of the body and a spring is embedded in the second feeding module, slide bars are fixed to the said first feeding module, wherein the second feeding module can move in the X axis direction in relation to the first feeding module and move in the X axis direction and Y axis direction in relation to the body, wherein the clamping component is fixed to the first feeding module, wherein the second feeding module is connected to the first lever through a universal bearing, wherein the first lever can be driven to control the movement of the second feeding module within a certain range in the XY-plane in relation to the body, wherein the third feeding module can move along the Z axis in relation to the body, the main axis component and the said guide component are both fixed to the said third feeding module, and the said third feeding module is fitted with a rack, wherein a spindle end of said second lever is equipped with a gear, when turned in the normal direction, the second lever can control the third feeding module to move along the Z axis using a rack mechanism of the gear, wherein when turned in the axial direction, the second lever can be locked, thereby fixing the third feeding module at a certain height on the Z axis.

5. The portable manual vertical milling key duplicating machine according to claim 1, wherein the handrail is rotated and locked on one side of the said body to serve as an operational support and help the user stabilize a workbench.

6. The portable manual vertical milling key duplicating machine according to claim 1, wherein the second lever is connected to the body through a spindle and can rotate in relation to the body, the second lever has a locking mechanism.

7. The portable manual vertical milling key duplicating machine according to claim 1, wherein the body is fitted with a handle, wherein the handle is fixed to the upper right part of the body to make the machine portable.

8. The portable manual vertical milling key duplicating machine according to claim 1, wherein the first feeding module and the second feeding module have a locking mechanism to lock the movement of the second feeding module in two directions in relation to the body on an as-needed basis.

9. The portable manual vertical milling key duplicating machine according to claim 1, wherein a flexible element is arranged between the said third feeding module and the body, wherein the flexible element has the restoring force that will force the third feeding module to move upward along the Z axis, and said flexible element uses a nitrogen spring.

10. The portable manual vertical milling key duplicating machine according to claim 1, wherein the lever base of the lever servo axis is provided with stepped holes, wherein the stepped holes are divided into the upper, middle and lower sections, the hole diameters decrease from top to bottom, wherein the middle section has threaded holes, while the upper and lower sections have unthreaded holes.

11. The portable manual vertical milling key duplicating machine according to claim 1, wherein the locking copper column is arranged in the lower section of a stepped hole of the lever base, constitutes a loose coupling relation with the unthreaded hole in the lower section, the top and bottom surfaces of the locking copper column are round, the lower round surface of the said locking copper column touches the internal round surface of the said arc limiting boss and the locking copper column may be replaced with abrasion-resistant plastic material.

12. The portable manual vertical milling key duplicating machine according to claim 1, wherein the upper end of the lever is a handle, the lower end is a threaded lever rod and wherein the lever rod is connected to the upper threaded hole on the lever base.

13. The portable manual vertical milling key duplicating machine according to claim 1, wherein the guide component comprises a mechanism body, a rotary knob, a tuning element, a first axis sleeve, a sealing element, a first flexible element, a first supporting element, a second axis sleeve, a handle, a second supporting element, a second flexible element, a push rod, a third axis sleeve and a probe, wherein the one end of the tuning element is fixed to the rotary knob, the other end is connected to the first axis sleeve via external thread, the end surface is fitted with the push rod, wherein the sealing element is arranged in the annular groove of the first supporting element and pressed with the rotary knob and the first supporting element is internally embedded in the said second axis sleeve, wherein the first supporting element is arranged inside the first axis sleeve and the second axis sleeve, wherein one end of the first flexible element pushes upward against the first axis sleeve and the other end is arranged downward, wherein the supporting element is internally embedded in the first axis sleeve and pressed against the first supporting element, wherein the upper end of the second flexible element pushes against the second supporting element, the lower end is pressed against the third axis sleeve and the lower end of the push rod is provided with a cylindrical hole and rigidly connected to the probe.

14. The portable manual vertical milling key duplicating machine according to claim 13, wherein one end of the tuning element is fitted with the rotary knob via a buckle, the other end of the tuning element is connected to the first axis sleeve via thread, the end surface of the tuning element is fitted with the push rod, wherein the external side of the first axis sleeve is provided with a cam path, and the first axis sleeve is fixed to the base without a movable axis.

\* \* \* \* \*